2 Sheets—Sheet 1.
G. W. SOULE.
Cotton and Hay Press.
No. 9,193. Reissued May 4, 1880.
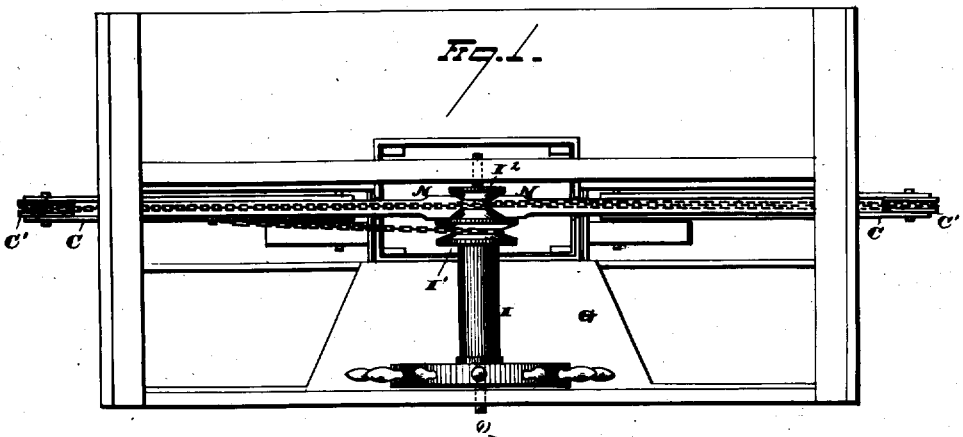
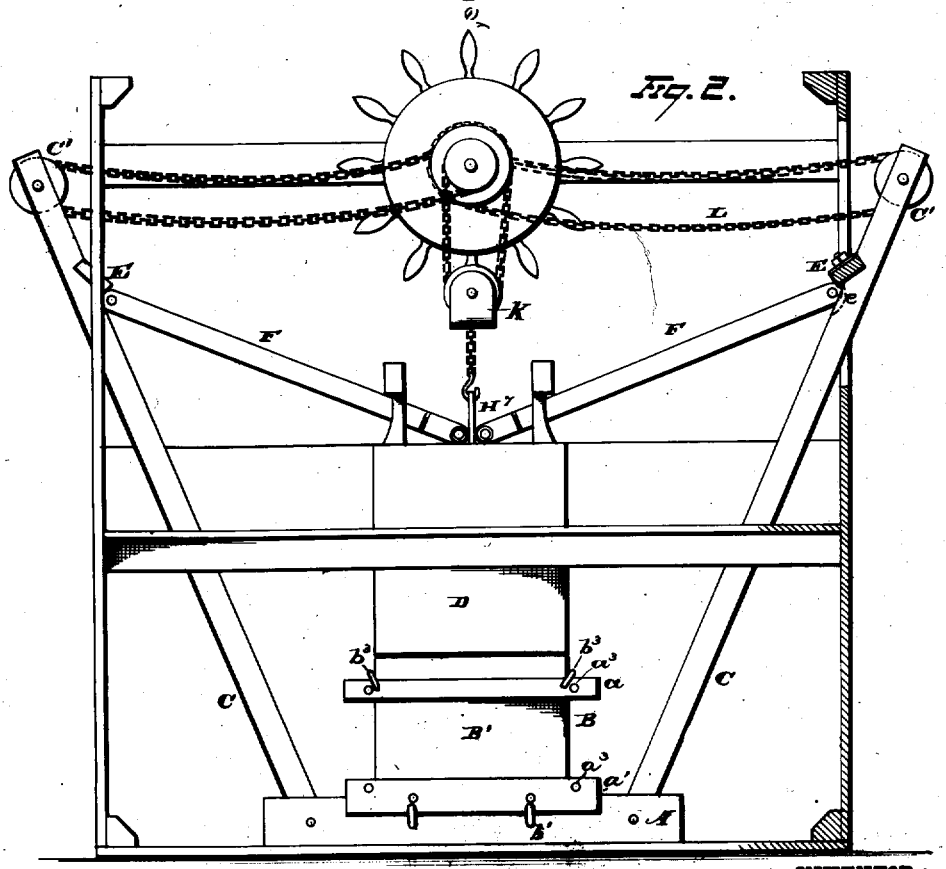
WITNESSES:
C. J. Nottingham,
F. O. McCleary.
INVENTOR:
George W. Soule.
By H. A. Seymour,
ATTORNEY.

G. W. SOULE.
Cotton and Hay Press.
No. 9,193. Reissued May 4, 1880.
Fig. 3.
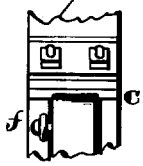
Fig. 4.
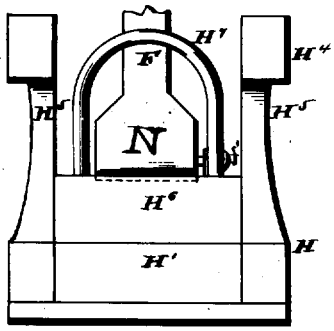
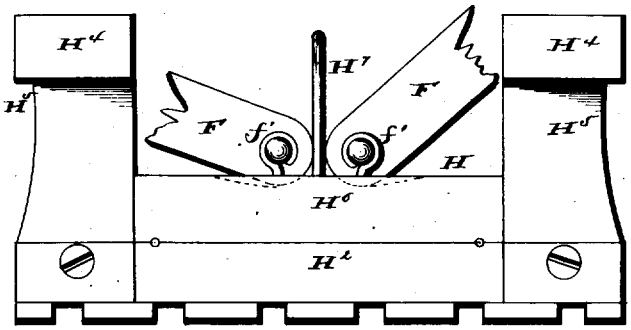
Fig. 6.
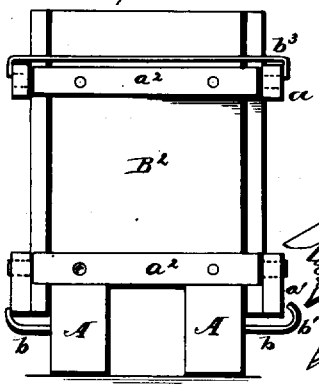
Fig. 5.
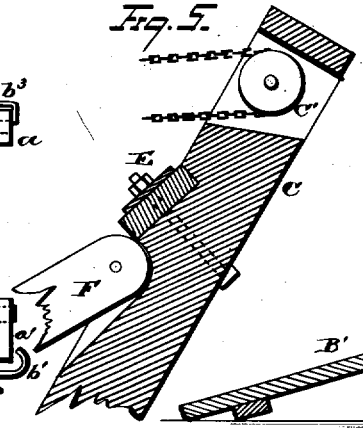
Fig. 7.
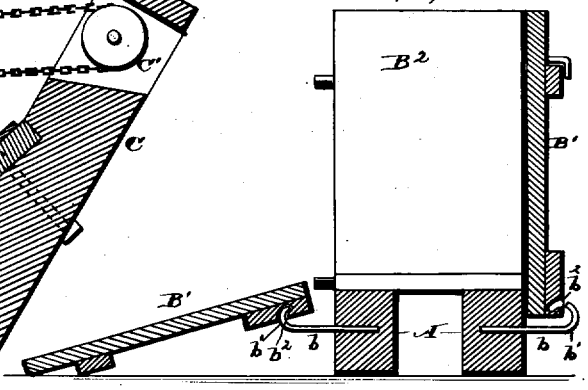
Fig. 8.
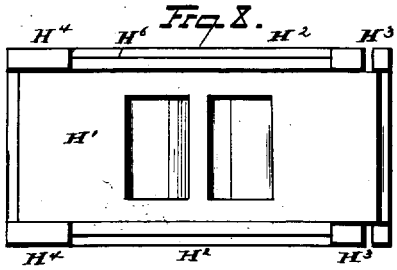
WITNESSES:
E. J. Nottingham,
J. O. M. Cleary,
INVENTOR:
George W. Soule.
By H. A. Seymour,
ATTORNEY.

UNITED STATES PATENT OFFICE.

GEORGE W. SOULE, OF MERIDIAN, MISSISSIPPI.

COTTON AND HAY PRESS.

SPECIFICATION forming part of Reissued Letters Patent No. 9,198, dated May 4, 1880.

Original No. 201,465, dated March 19, 1878. Application for reissue filed February 11, 1880.

*To all whom it may concern:*

Be it known that I, GEO. W. SOULE, of Meridian, in the county of Lauderdale and State of Mississippi, have invented certain new and useful Improvements in Cotton and Hay Presses; and I do hereby declare the following to be a full, clear, and exact description of the invention, such as will enable others skilled in the art to which it pertains to make and use it, reference being had to the accompanying drawings, which form part of this specification.

My invention relates to an improvement in cotton and hay presses, the object being, first, to provide a baling-press of such construction and relative arrangement of parts that the follow-block may be actuated by lever power, and moved laterally from the press-box for refilling the latter.

A further object is to construct the toggle-arms, which are interposed between the levers and follow-block, of such form that they will be of the minimum weight consistent with the requisite strength, and afford wide and extended bearings to transmit the pressure in an equable and uniform manner to the follow-block.

A further object of my invention is to construct the follow-block of such form that the bagging will not become wedged between the follow-block and guides and the box which acts as an outside guide during the operation of the baling-press.

A further object of my invention is to provide simple and efficient means for supporting and hinging the side doors of the press-box.

A further object of my invention is to provide a baling-press with devices for operating the same which shall embody simplicity and durability in their construction and relative arrangement, and adapted to be supplied at a small initial cost; and to these several ends my invention consists, first, in the combination, with the follow-block and suitable windlass for raising the same, of operating-levers and toggle-arms connected at one end with the operating-lever and at their other ends with the follow-block in such a manner that the inner ends of the toggle-arms and follow-block may be moved laterally and away from over the press-box to allow of the refilling of the latter.

My invention further consists in the combination, with a follow-block and a windlass provided with pulleys of different diameters, operating-levers, and toggle-arms interposed between the follow-block and operating-levers, of an endless cord, rope, or chain connected with the differential pulleys of the windlass, pulleys journaled in the upper ends of the operating-levers, and a sheave or pulley, which latter is connected with the follow-block.

My invention further consists in a follow-block provided with guides having recesses formed in their outer faces.

My invention further consists in a follow-block composed of a central section, side piece, and vertical guides secured in corner recesses in the follow-block.

My invention further consists in the combination, with the press-box, of pins secured to the sills and adapted to support and serve as hinges for the side doors.

My invention further consists in several other details of construction and combination of parts in a baling-press, as will hereinafter be described, and pointed out in the claims.

In the drawings, Figure 1 is a plan. Fig. 2 is a side elevation. Fig. 3 is an end view of the follower-block with one of the toggle-arms, showing the mode of attachment. Fig. 4 is a side view of the follower-block and lower ends of both toggle-arms. Fig. 5 is a vertical section of the upper end of one of the levers, showing the pulley and manner of applying the end of the toggle-arm. Fig. 6 is an end view of press-box. Fig. 7 is a cross-section of the press-box, showing the manner of hinging the sides to the bottom; and Fig. 8 is a plan of the follower-block with two of the corner-guides removed.

A A are the sills which support the press-box B, and to which are pivoted the lower ends of the operating-levers C. The side doors, B′, of the press-box B are provided with upper cross-bars or cleats, $a$, and lower cross-bars or cleats, $a'$, while the ends $B^2$ of the press-box are provided with cross-bars or cleats $a^2$. The ends of the cleats $a^2$ on the end boards, $B^2$, are extended outward, and provided with tenons of proper form to readily enter the holes $a^3$ in the extended ends of the cleats $a$ $a'$ when the press-box is set for use.

To the sills A A are rigidly secured the pins or bars $b$, which extend outwardly from the sills, and have hooks $b'$ formed on their outer ends. The side boards, B′, of the press-box rest upon the pins or bars $b$, and may be turned down, as shown in Fig. 7, the hooks $b'$ entering holes or recesses $b^2$, formed in the bottom cleat, $a'$. The hooks fit snugly against the lower cleat when the press-box is set up for use, and serve to hold the lower portions of the side boards firmly in place. The end boards are held from being crowded outward by the extension of the cleats $a^2$ in the holes in the ends of the cleats $a$ $a'$, while the upper ends or sides of the side boards, B′, are held by the removable clamps $b^3$. Thus it will be observed that the press-box is of strong and durable construction.

By removing the clamps $b^3$ the sides of the box may be readily turned down to a horizontal position, the hooks $b'$ serving as hinges, or the side doors may be readily removed from the press-box if desired. The ends of the press-box may also be turned down onto the sills or removed from the press-box, as desired.

D is the upper section of the press-box, and is of the ordinary construction, and of such size and form as to correspond with the press-box B. C are the operating-levers, and are pivoted at their lower ends to the sills A, and provided at their upper ends with the pulleys C′. They have affixed to them, below the pulleys C′, the blocks E, which have their upper edges let into the levers, while the lower edges project outward, as shown. These blocks E are secured immediately above the point where the toggle-arms, hereinafter described, are attached to the levers. They serve to increase the strength of the levers at the points of greatest strain, to furnish a substantial shoulder for a bearing for the outer ends of the toggle-arms without seriously cutting away the levers, and when worn may be readily replaced by others.

The block E is set into the lever C at an angle of inclination parallel with the line of greatest resisting force or strain transmitted through the toggle-arms when the compression of the bale is being completed. A slight recess, $e$, equal to about one-third the thickness of the end of the toggle-arm, is made in the lever C, just below the block E, so that the toggle-arm may be properly connected with the lever, as will be hereinafter explained.

F F represent the toggle-arms, each being secured by a pin and staple, $f$, on one side, to the levers C, and by a pin and staple, $f'$ on the opposite side, to the follow-block, as will be readily understood by reference to Fig. 3. The upper or outer end of the toggle-arm bears against the block E, while the lower or inner end rests in a slight recess in the upper surface of the follow-block H, as indicated in Figs. 3 and 4. The ends of the toggle-arms resting in slight recesses in, and being secured on opposite sides to, the levers and follow-block, as explained, permit the follow-block, when raised out of the box, to be swung off to one side onto the platform G or other suitable support, when it will be out of the way while the compressed bale is being removed and while preparations are being made for pressing a new bale. When everything is in readiness for the pressing of a new bale, a turn or two of the windlass will raise the follower off the platform G, so that it will swing of its own gravity over the press-box.

The lower or inner ends of the toggle-arms F F are provided with wide bearings N N, in order that the pressure transmitted to the follow-block through the toggle-arms shall be evenly distributed across the rear or upper side of the follow-block, and thus prevent the latter from tipping sidewise as it is forced downwardly into the press-box. While the bearings N N are of the requisite length to engage with the rear side of the follow-block, the remaining portion of the toggle-arms is simply of such size as will resist the strain or pressure exerted thereon, and hence the toggle-arms may be made of the minimum weight and yet afford full and ample bearing-surface upon the follow-block.

Owing to the great length and width required for a follow-block for baling cotton, it is difficult to secure a single piece of wood of the required size that will endure the variable strains and pressures or be prevented from warping. Hence I construct my improved follow-block, as follows: It is composed of the central piece or bar, H′, of a length equal to the longer diameter of the press-box, and of the side bars, $H^2$ $H^2$, shorter than the central piece or bar, H′, so as to constitute corner recesses $H^3$ for the reception of the vertical guides $H^4$.

In a follow-block constructed substantially as shown and described, with the wide flat piece or bar H′ and the narrow side bars, $H^2$ $H^2$, set vertically with the vertical corner-guides, $H^4$, all firmly secured together, as shown and described, there is little or no liability of the follow-block being warped or pressed out of shape by the heavy pressure exerted thereon by means of the windlass-levers and toggle-arms.

Heretofore, in presses of the type to which my improvement belongs, the follow-blocks were provided with straight guides arranged to fit closely in the press-box, to cause the follow-block to be retained in its horizontal position when forced through its downstroke. Without some provision of this kind to guide the follow-block the latter would incline one way or the other in descending, as it is free to turn on the inner ends of the toggle-arms, and thus form large-ended bales, or bales with one end considerably larger than the other; but in such presses wherein the plain straight guides were employed the bagging would become wedged between the guides and box, as the latter serves as an outside guide, and, owing to the great pressure on the follow-block, the bagging would often become so firmly wedged between the guides and press-box as to render it almost impossible to remove it, and necessitated the employment of a pinch-bar for that purpose; but such operation soon ruined the press-box. By recessing the outer faces of the guides and upper edges of the follow-block I provide ample space for all surplus bagging, and thus render the operation of pressing most certain, speedy, and effectual.

The vertical corner-guides $H^4$ are extended above the top of the follower, and have wedge-shaped recesses $H^5$ formed in their outer sides, and ends extending down to about the middle of the follow-block. The upper part of the side bars are beveled, as shown at $H^6$ $H^6$, to correspond with the inward slope of the recesses $H^5$, as shown. These recesses and the beveling of the side bars are for the purpose of providing a space for the doubling or folding in and holding the edges of the bagging, and thus obviate the wedging of the bagging between the follow-block and guideway, which is a source of great trouble and inconvenience so often experienced in baling-presses of ordinary construction.

$H^7$ is a rod or bail connected with the upper side of the follower, by which the latter is connected with the endless chain or rope by which the machine is operated.

I represents the windlass, which is arranged vertically over the center of the press-box. To the windlass-shaft are secured the two pulleys, a large one, I′, and a smaller one, $I^2$, arranged close together and immediately over the press-box, as shown. The windlass may be turned by hand or by any other suitable power. I have represented in the drawings means for operating the press by hand-power only.

K is a pulley, secured by links or other suitable means to the rod $H^7$ on the follow-block. L is an endless chain or rope. Its upper part or half extends between and passes over and around the pulleys C′ C′ on the levers C; while one end of the upper portion passes around the larger pulley, I′, and the other end around the small pulley, $I^2$, on the windlass I, and both ends are united together around the pulley K, as shown in Fig. 1.

In the operation of the press, if the windlass be turned in one direction the chain will be taken up and the levers drawn together, causing the toggle-arms to force the follow-block downwardly into the press-box. At the same time that the chain is shortened between the levers it is paid out or lengthened below, and allows the follow-block to descend as rapidly as the inward movement of the levers requires. The reverse movement of the windlass serves to lift the follower and pays out the chain or rope to the levers, allowing them to fall back into the position indicated in Fig. 2, and raises the follower out of the box, so that it may be swung aside, as heretofore explained.

Having fully described my invention, what I claim as new, and desire to secure by Letters Patent, is—

1. The combination, with a follow-block and suitable windlass connected therewith for raising the follow-block, of operating-levers and toggle-arms connected at one end with the operating-levers and at their opposite ends with the follow-block, the connections being such that the inner ends of the toggle-arms and follow-block may be moved both vertically and laterally to enable the follow-block to be swung laterally away from over the press-box without disconnecting the parts or moving the press-box, substantially as set forth.

2. The combination, with a follow-block and a windlass provided with pulleys of different diameters, operating-levers, and toggle-arms interposed between the operating-levers and follow-block, of an endless rope or chain encircling the differential pulleys of the windlass and pulleys, journaled in the upper ends of the operating-levers, and a sheave or pulley connected with the follow-block, substantially as set forth.

3. A follow-block provided with vertical guides having recesses formed in their outer faces, substantially as set forth.

4. A follow-block for cotton or hay presses constructed with vertical guides having wedge-shaped recesses formed in their outer faces, substantially as set forth.

5. A follow-block for cotton or hay presses constructed with vertical guides having recesses formed in their outer faces, the follow-block having upper beveled sides, substantially as set forth.

6. A follow-block for cotton or hay presses composed of a main or central section, side pieces connected therewith, and vertical guides secured in recesses in the follow-block, substantially as set forth.

7. The combination, with the press-box, of pins or bars rigidly secured to the sills, said pins or bars having upwardly-projecting outer ends, and the side doors provided with recesses for the reception of the upwardly-projecting portions of said pins or bars, substantially as set forth.

8. The combination, with the follow-block, windlass, endless chain or rope, and toggle-arms connected at their inner ends with the follow-block, of actuating-levers pivoted at their lower ends and connected with the windlass by the endless chain or rope at their upper ends, said actuating-levers provided with renewable bearings and shallow recesses below said bearings, the outer ends of said toggle-arms engaging in said shallow recesses, substantially as set forth.

9. The combination, with the follow-block and toggle-arms pivoted thereto at one end and to operating-levers at their outer ends, of a windlass provided with differential pulleys and a single endless chain or rope encircling the differential pulleys of the windlass, and pulleys journaled in the upper ends of the operating-levers, and a sheave or block connected with the follow-block, substantially as set forth.

10. The combination, with the follow-block and operating-levers, of toggle-arms connected at opposite ends to the follow-block and operating-levers by means of swivel-joints to allow the follow-block to be moved both vertically and laterally, substantially as set forth.

In testimony that I claim the foregoing I hereunto set my hand this 3d day of February, 1880.

GEORGE W. SOULE.

Witnesses:
A. J. HYDE,
W. C. FITZGERALD.